United States Patent
Kwon et al.

(10) Patent No.: US 9,601,948 B2
(45) Date of Patent: Mar. 21, 2017

(54) WIRELESS POWER TRANSMISSION APPARATUS AND METHOD

(71) Applicants: SAMSUNG ELECTRONICS CO., LTD., Suwon-si (KR); INDUSTRY-ACADEMIC COOPERATION FOUNDATION, DANKOOK UNIVERSITY, Yongin-si (KR)

(72) Inventors: Ui Kun Kwon, Hwaseong-si (KR); Sang Joon Kim, Hwaseong-si (KR); Seung Keun Yoon, Seoul (KR); Young Seok Ko, Yongin-si (KR); Shi Hong Park, Yongin-si (KR)

(73) Assignees: Samsung Electronics Co., Ltd., Suwon-si (KR); Industry-Academic Cooperation Foundation, Dankook University, Yongin-si (KR)

( * ) Notice: Subject to any disclaimer, the term of this patent is extended or adjusted under 35 U.S.C. 154(b) by 628 days.

(21) Appl. No.: 14/065,916

(22) Filed: Oct. 29, 2013

(65) Prior Publication Data

US 2014/0117771 A1    May 1, 2014

(30) Foreign Application Priority Data

Oct. 31, 2012 (KR) .................... 10-2012-0121980

(51) Int. Cl.
| | | |
|---|---|---|
| H01F 38/14 | (2006.01) |
| H02J 17/00 | (2006.01) |
| H02J 5/00 | (2016.01) |
| H02J 7/02 | (2016.01) |

(52) U.S. Cl.
CPC .............. H02J 17/00 (2013.01); H02J 5/005 (2013.01); H02J 7/025 (2013.01)

(58) Field of Classification Search
None
See application file for complete search history.

(56) References Cited

U.S. PATENT DOCUMENTS

| | | |
|---|---|---|
| 6,509,781 B2 | 1/2003 | Dufort |
| 7,161,263 B2 | 1/2007 | Von Styp-Rekowski et al. |
| 7,352,084 B2 * | 4/2008 | Hall .................. G08B 13/2411 307/104 |
| 2003/0169092 A1 | 9/2003 | Zuk |
| 2005/0271148 A1 | 12/2005 | Dupuis |
| 2009/0096413 A1 * | 4/2009 | Partovi .................. H01F 5/003 320/108 |
| 2012/0086499 A1 | 4/2012 | Husain et al. |

FOREIGN PATENT DOCUMENTS

JP      5-207732 A      8/1993

\* cited by examiner

*Primary Examiner* — Jared Fureman
*Assistant Examiner* — Aqeel Bukhari
(74) *Attorney, Agent, or Firm* — NSIP Law

(57) ABSTRACT

A wireless power transmission apparatus includes a resonator configured to transmit power to another resonator, and a power supply unit configured to supply power to the resonator. The apparatus further includes a switching unit including a transistor configured to be turned on to connect the power supply unit to the resonator, and to be turned off to disconnect the power supply unit from the resonator, based on a control signal, and a diode connected in series to the transistor.

27 Claims, 13 Drawing Sheets

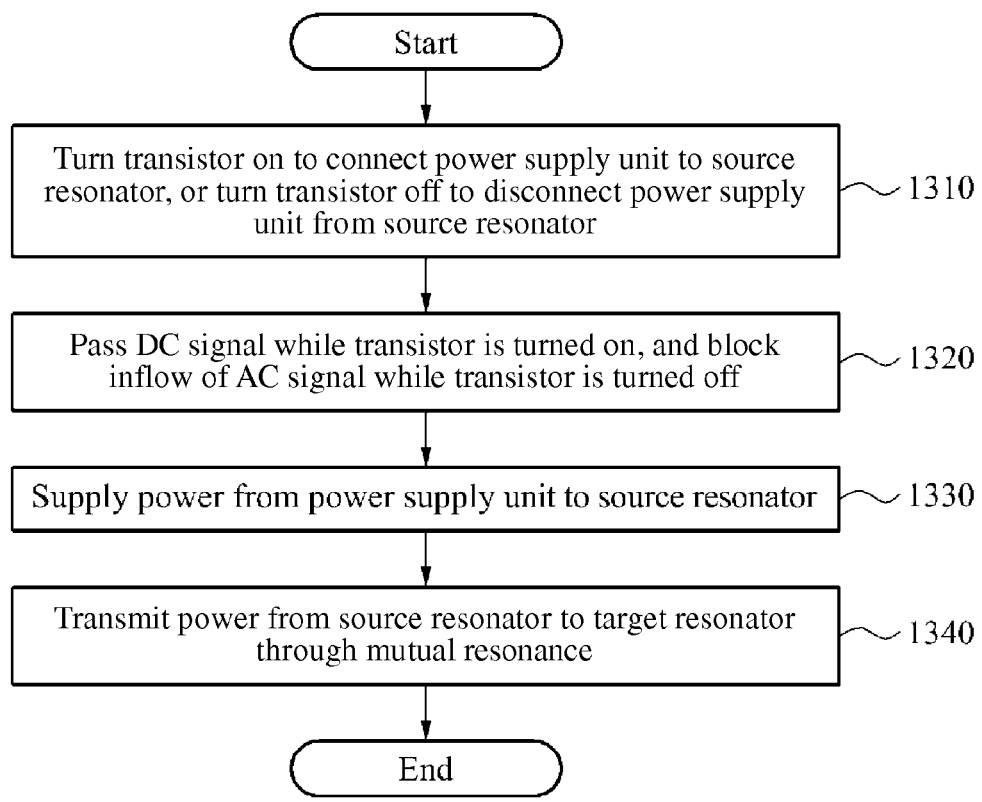

WIRELESS POWER TRANSMISSION APPARATUS AND METHOD

CROSS-REFERENCE TO RELATED APPLICATION

This application claims the benefit under 35 USC 119(a) of Korean Patent Application No. 10-2012-0121980, filed on Oct. 31, 2012, in the Korean Intellectual Property Office, the entire disclosure of which is incorporated herein by reference for all purposes.

BACKGROUND

1. Field

The following description relates to a wireless power transmission apparatus and a wireless power transmission method.

2. Description of Related Art

Research on wireless power transmission has been started to overcome issues, such as an increasing inconvenience of wired power supply and limits to existing battery capacities, due to an increase in various electronic devices including mobile terminals. In particular, research has been concentrated on near-field wireless power transmission. The near-field wireless power transmission refers to an example in which a distance between a transmission coil and a reception coil is sufficiently short, compared to a wavelength in an operation frequency. A wireless power transmission and reception system using a resonance characteristic may include a source device configured to supply power, and a target device configured to receive the supplied power.

SUMMARY

In one general aspect, there is provided a wireless power transmission apparatus including a resonator configured to transmit power to another resonator, and a power supply unit configured to supply power to the resonator. The apparatus further includes a switching unit including a transistor configured to be turned on to connect the power supply unit to the resonator, and to be turned off to disconnect the power supply unit from the resonator, based on a control signal, and a diode connected in series to the transistor.

In another general aspect, there is provided a wireless power transmission method including turning a transistor on to connect a power supply unit to a resonator, or turning the transistor off to disconnect the power supply unit from the resonator, based on a control signal, the transistor connected in series to a diode. The method further includes supplying power from the power supply unit to the resonator in response to the transistor being turned on, and transmitting power from the resonator to another resonator.

In still another general aspect, there is provided a wireless power reception apparatus including a resonator configured to receive power from another resonator, and a load configured to receive power from the resonator. The apparatus further includes a switching unit including a transistor configured to be turned on to connect the resonator to the load, and to be turned off to disconnect the resonator from the load, based on a control signal, and a diode connected in series to the transistor.

Other features and aspects will be apparent from the following detailed description, the drawings, and the claims.

BRIEF DESCRIPTION OF THE DRAWINGS

FIG. 13 is a flowchart illustrating an example of a wireless power transmission method.

DETAILED DESCRIPTION

Figure 1:
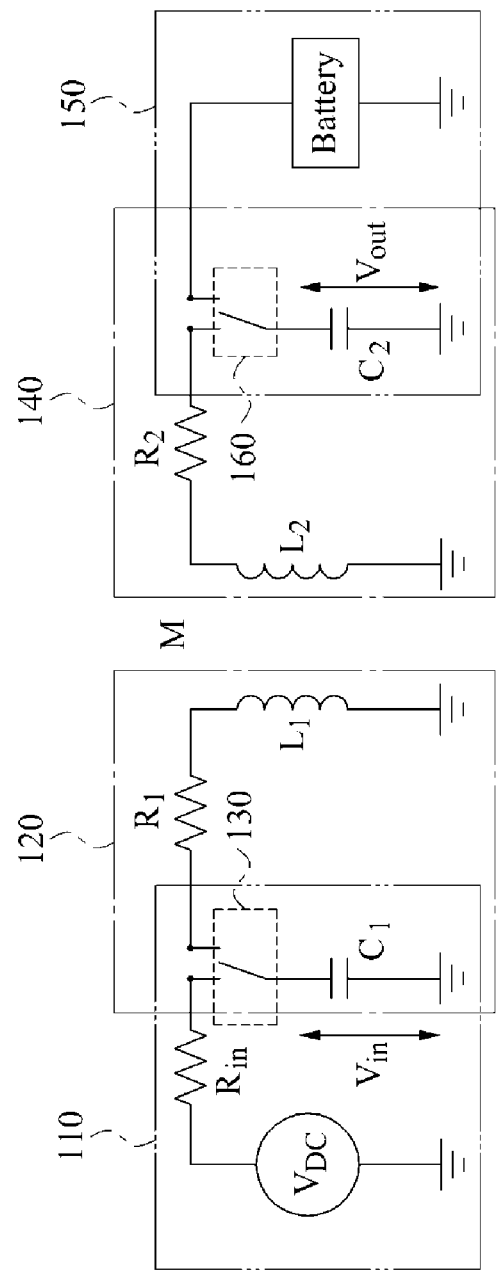
FIG. 1 is a diagram illustrating an example of an equivalent circuit of a wireless power transmission system.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A wireless power transmission system may be applied to various systems requiring wireless power. The wireless power transmission system may be applied to a system enabling use of wireless power, for example, a mobile phone, a wireless television (TV), and/or other systems known to one of ordinary skill in the art. Additionally, the wireless power transmission system may be applicable in a bio-healthcare field, may be used to remotely transmit power to a device inserted into a human body, and may be used to wirelessly transmit power to a bandage-shaped device for measurement of a heart rate.

The wireless power transmission system may also be applied to a device, such as a low-power sensor operating using a relatively small amount of power and with a relatively low power consumption. Additionally, the wireless power transmission system may be used to remotely control an information storage device without a power source. The wireless power transmission system may further be applied to a system that supplies power to an information storage device to remotely operate the information storage device, and to wirelessly request information stored in the information storage device.

The wireless power transmission system may receive energy supplied from a power supply unit, and may store the energy in a source resonator, to generate a signal. The wireless power transmission system may power off a switch that electrically connects the power supply unit to the source resonator to induce the source resonator to self-resonate. For example, when a target resonator with the same resonant frequency as the source resonator is disposed within a distance close enough to resonate with the source resonator that self-resonates, a mutual resonance phenomenon may occur between the source resonator and the target resonator. In various examples herein, the source resonator may refer to a resonator that receives energy from a power supply unit, and the target resonator may refer to a resonator that receives energy from the source resonator due to the mutual resonance phenomenon.

FIG. 1 illustrates an example of an equivalent circuit of a wireless power transmission system. Referring to FIG. 1, the wireless power transmission system includes a source-target structure including a source device and a target device. The wireless power transmission system includes a wireless power transmission apparatus corresponding to the source device, and a wireless power reception apparatus corresponding to the target device.

In more detail, the wireless power transmission apparatus includes a power input unit 110, a power transmitting unit 120, a switch unit 130, and a capacitor $C_1$. The power input unit 110 is physically-separated from the power transmitting unit 120 by the switch unit 130 and the capacitor $C_1$. The wireless power reception apparatus includes a receiving unit 140, a power output unit 150, a switch unit 160, and a capacitor $C_2$. The receiving unit 140 is physically-separated from the power output unit 150 by the switch unit 160 and the capacitor $C_2$.

The power input unit 110 stores energy in the capacitor $C_1$, using a power supply unit generating an input voltage $V_{DC}$. The switch unit 130 connects the capacitor $C_1$ to the power input unit 110, while the energy is transmitted from the power supply unit and stored in the capacitor $C_1$. To discharge the stored energy, the switch unit 130 disconnects the capacitor $C_1$ from the power input unit 110, and connects the capacitor $C_1$ to the power transmitting unit 120. The switch unit 130 prevents the capacitor $C_1$ from being connected to the power input unit 110 and the power transmitting unit 120 at the same time.

The power transmitting unit 120 transfers electromagnetic energy to the receiving unit 140, through mutual resonance. In more detail, the power transmitting unit 120 transfers the electromagnetic energy through the mutual resonance between a transmission coil $L_1$ of the power transmitting unit 120 and a reception coil $L_2$ of the receiving unit 140. The level of the mutual resonance between the transmission coil $L_1$ and the reception coil $L_2$ is affected by mutual inductance M between the transmission coil $L_1$ and the reception coil $L_2$.

For example, the power transmitting unit 120 may quantize the electromagnetic energy stored in the capacitor $C_1$, and may transmit the quantized energy to the receiving unit 140 for a symbol unit. The power transmitting unit 120 may control different amounts of the electromagnetic energy to be transmitted to the receiving unit 140 for each symbol unit, and may also transmit information to the receiving unit 140. The symbol unit may be used to transfer the information in a single bit between the source device and the target device. The symbol unit refers to a period or cycle during which the charged capacitor $C_1$ is discharged through the mutual resonance between a source resonator (e.g., the power transmitting unit 120) and a target resonator (e.g., the receiving unit 140), based on an operation of the switch unit 130.

The power input unit 110 includes the power supply unit generating the input voltage $V_{DC}$, an internal resistor $R_{in}$, and the capacitor $C_1$, and the power transmitting unit 120 includes a resistor $R_1$, the transmission coil $L_1$, and the capacitor $C_1$ that form the source resonator. Additionally, the switch unit 130 includes at least one switch. For example, the switch may include an active element enabling an on/off function. In FIG. 1, $R_1$, $L_1$, and $C_1$ represent a resistance, an inductance, and a capacitance, respectively, of the source resonator. A voltage applied to the capacitor $C_1$ among the input voltage $V_{DC}$ is represented by $V_{in}$.

In FIG. 1, the receiving unit 140 receives the electromagnetic energy from the power transmitting unit 120, and stores the received electromagnetic energy in the capacitor $C_2$. The switch unit 160 connects the capacitor $C_2$ to the receiving unit 140, while the electromagnetic energy is transmitted from the power transmitting unit 120 and stored in the capacitor $C_2$. To discharge the stored energy, the switch unit 160 disconnects the capacitor $C_2$ from the receiving unit 140, and connects the capacitor $C_2$ to the power output unit 150. The power output unit 150 transfers the energy stored in the capacitor $C_2$ to a load, for example, a battery. The switch unit 160 prevents the capacitor $C_2$ from being connected to the receiving unit 140 and the power output unit 150 at the same time.

In more detail, the receiving unit 140 receives the electromagnetic energy through the mutual resonance between the reception coil $L_2$ of the receiving unit 140 and the transmission coil $L_1$ of the power transmitting unit 120. The receiving unit 140 charges the capacitor $C_2$ connected to the reception coil $L_2$, with the received electromagnetic energy. The power output unit 150 transfers the energy used to charge the capacitor $C_2$ to the load, for example, the battery. As another example, the power output unit 150 may transfer the energy to a target device requiring power, instead of to the battery.

For example, the receiving unit 140 may receive the electromagnetic energy from the power transmitting unit 120 for a symbol unit. The receiving unit 140 may further receive the information from the power transmitting unit 120, and may demodulate the information based on an amount of the received electromagnetic energy.

The receiving unit 140 includes a resistor $R_2$, the reception coil $L_2$, and the capacitor $C_2$ that form a target resonator, and the power output unit 150 includes the capacitor $C_2$ and the battery. The switch unit 160 includes at least one switch. In FIG. 1, $R_2$, $L_2$, and $C_2$ represent a resistance, an inductance, and a capacitance, respectively, of the target resonator. A voltage applied to the capacitor $C_2$ among the electromagnetic energy received by the reception coil $L_2$ is represented by $V_{out}$.

The above-described wireless power transmission system enables power to be wirelessly transmitted when the power input unit 110 is physically separated from the power transmitting unit 120, and the receiving unit 140 is physically separated from the power output unit 150. This wireless power transmission system is referred to as a Resonator Isolation (RI) system.

The RI system does not need a power amplifier because power may be supplied from a direct current (DC) source (e.g., the power supply unit generating the input voltage $V_{DC}$) directly to the source resonator. Further, the RI system does not require a rectifying operation of a rectifier because energy is captured from energy used to charge the capacitor $C_2$ of the wireless power reception apparatus. Further, a transmission efficiency is not sensitive to a change in a distance between the wireless power transmission apparatus and the wireless power reception apparatus because there is no need to perform impedance matching. Additionally, the RI system may be easily extended from the wireless power transmission system including a single transmitter and a single receiver to a wireless power transmission system including a plurality of transmitters and a plurality of receivers.

Figure 2:
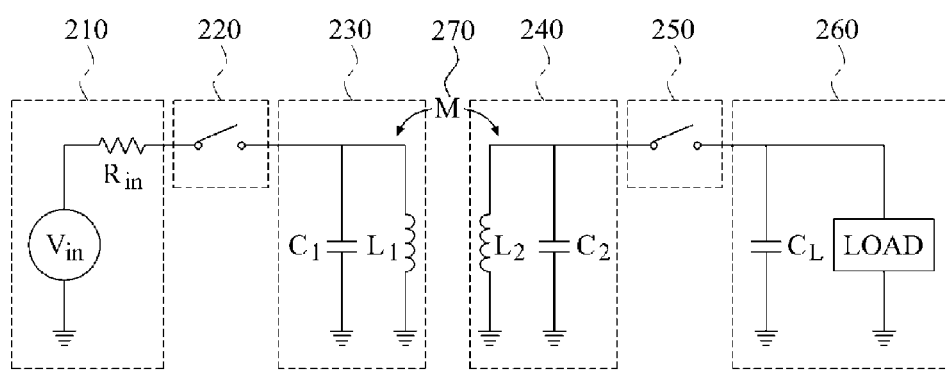
FIG. 2 is a diagram illustrating another example of an equivalent circuit of a wireless power transmission system.

FIG. 2 illustrates another example of an equivalent circuit of a wireless power transmission system. FIG. 2 illustrates another example of an RI system.

Referring to FIG. 2, the wireless power transmission system includes a source-target structure including a source device and a target device. The wireless power transmission system includes a wireless power transmission apparatus corresponding to the source device, and a wireless power reception apparatus corresponding to the target device.

In more detail, the wireless power transmission apparatus includes a power charging unit 210, a control unit 220, and a transmitting unit 230. The power charging unit 210 is physically separated from the transmitting unit 230 by the control unit 220. The wireless power reception apparatus includes a charging unit 240, a control unit 250, and a power output unit 260. The charging unit 240 is physically separated from the power output unit 260 by the control unit 250.

In this example, the power charging unit 210 includes a power supply unit $V_{in}$ and an internal resistor $R_{in}$. The transmitting unit 230 includes a capacitor $C_1$ and an inductor $L_1$. In FIG. 2, the capacitor $C_1$ and the inductor $L_1$ are referred to as a source resonator. In this example, the source resonator functions as the transmitting unit 230. The transmitting unit 230 transmits energy stored in the source resonator to a target resonator, through mutual resonance M 270 between the source resonator and the target resonator.

The control unit 220 includes a switch, and turns on (e.g., closes) the switch to enable power to be supplied from the power charging unit 210 to the transmitting unit 230. In more detail, a voltage from the power supply unit $V_{in}$ is applied to the capacitor $C_1$, and a current is applied to the inductor $L_1$. For example, when the source resonator reaches a steady state due to the voltage applied from the power supply unit $V_{in}$, the voltage applied to the capacitor $C_1$ may include a value of '0', and the current flowing in the inductor $L_1$ may include a value of '$V_{in}/R_{in}$'. In the steady state, the source resonator may be charged with power, using the current applied to the inductor $L_1$.

When the power used to charge the source resonator in the steady state reaches a predetermined value or a maximum value, the control unit 220 turns off (e.g., opens) the switch. The control unit 220 may set information on the predetermined value. By turning off the switch, the control unit 220 separates the power charging unit 210 from the transmitting unit 230. When the power charging unit 210 is separated from the transmitting unit 230, the source resonator starts self-resonating between the capacitor $C_1$ and the inductor $L_1$. Energy stored in the source resonator is transferred to the target resonator, through the mutual resonance M 270 between the source resonator and the target resonator. A resonant frequency $f_1$ of the source resonator may be the same as a resonant frequency $f_2$ of the target resonator. Additionally, a value of the resonant frequency $f_1$, and a value of resonant frequency $f_2$, may be determined based on the following equations.

$$f_1 = \frac{1}{2\pi\sqrt{L_1 C_1}}, \quad (1)$$

$$f_2 = \frac{1}{2\pi\sqrt{L_2 C_2}}$$

In Equations (1), $L_1$ denotes an inductance of the inductor $L_1$, $C_1$ denotes a capacitance of the capacitor $C_1$, $L_2$ denotes an inductance of an inductor $L_2$ of the target resonator, and $C_2$ denotes a capacitance of a capacitor $C_2$ of the target resonator.

The transmitting unit 230 may quantize the energy stored in the source resonator, and may transmit the quantized energy to the target resonator for a symbol unit. For example, the transmitting unit 230 may control different amounts of the energy to be transmitted to the target resonator for each symbol unit, and may also transmit information to the target resonator. The symbol unit may be used to transfer the information in a single bit between the source device and the target device. The symbol unit refers to a period or cycle during which the charged capacitor $C_1$ and the inductor $L_1$ are discharged through the mutual resonance M 270 between the source resonator and target resonator, based on an operation of the control unit 220.

In this example, the charging unit 240 includes the capacitor $C_2$ and the inductor $L_2$. In FIG. 2, the capacitor $C_2$ and the inductor $L_2$ are referred to as the target resonator. In this example, the target resonator functions as the charging unit 240. The charging unit 240 receives the energy stored in the source resonator via the target resonator, through the mutual resonance M 270 between the source resonator and the target resonator. The power output unit 260 includes a load and a capacitor $C_L$.

The control unit 250 includes a switch, and turns off (e.g., opens) the switch. By turning off the switch, the control unit 250 separates the charging unit 240 from the power output unit 260. During the mutual resonance M 270 between the source resonator and the target resonator, the source resonator is separated from the power supply unit $V_{in}$ by the control unit 220 including the switch being open, and the target resonator is separated from the load and the capacitor $C_L$ by the control unit 250 including the switch being open. The energy stored in the source resonator is transferred to the target resonator, through the mutual resonance M 270. In more detail, the energy stored in the source resonator charges the capacitor $C_2$ and the inductor $L_2$ of the charging unit 240, through the mutual resonance M 270. The resonant frequency $f_1$ of the source resonator may be the same as the resonant frequency $f_2$ of the target resonator.

When the energy used to charge the target resonator reaches a predetermined value or a maximum value, the control unit 250 turns on (e.g., closes) the switch. The control unit 250 may set information on the predetermined value. By turning on the switch, the control unit 250 connects the capacitor $C_L$ to the charging unit 240, and the resonant frequency of the target resonator is changed. A value of the changed resonant frequency $f_2$ of the target resonator may be determined based on the following equation.

$$f'_2 = \frac{1}{2\pi\sqrt{L_2(C_2 + C_L)}} \quad (2)$$

In Equation (2), $C_L$ denotes a capacitance of the capacitor $C_L$.

Accordingly, the mutual resonance M 270 between the source resonator and the target resonator is terminated. For example, when the changed resonant frequency $f_2$ is much smaller than the resonant frequency $f_2$ based on a Q-factor of the target resonator, the mutual resonance M 270 is removed. Additionally, the charging unit 240 transfers power used to charge the capacitor $C_2$ and the inductor $L_2$ to the power output unit 260, which transfers the power to a load.

When the energy used to charge the target resonator is less than a predetermined value, the control unit 250 turns off the switch. The charging unit 240 may recharge the target resonator with energy using the mutual resonance M 270 between the source resonator and the target resonator.

For example, the charging unit 240 may receive the energy from the transmitting unit 230 for a symbol unit. The charging unit 240 may also receive the information from the transmitting unit 230, and may demodulate the information based on an amount of the received energy.

During the mutual resonance M 270 between the source resonator and the target resonator, the switch of the control unit 250 is not connected between the charging unit 240 and the power output unit 260. Accordingly, it is possible to prevent transmission efficiency from being reduced due to a connection to the switch.

A scheme of controlling a point in time of capturing energy stored in a target resonator of FIG. 2 may be performed more easily than a scheme of transferring energy stored in a capacitor of FIG. 1. In the scheme of transferring the energy stored in a capacitor, only the energy in the capacitor is captured. However, in a scheme of changing a resonant frequency of the target resonator and capturing the energy stored in the target resonator, the energy stored in an inductor and a capacitor of the target resonator is captured. Accordingly, a degree of freedom for the point in time of capturing the energy may be improved.

To transmit power or data, a transmission (TX) end (e.g., a wireless power transmission apparatus) in an RI system may repeatedly charge a source resonator with energy, and discharge the energy, through a connection to and an operation of a switch. In various examples herein, a single charge and discharge of energy may be, for example, in a single symbol. To receive power or data from the TX end, a reception (RX) end (e.g., a wireless power reception apparatus) in the RI system may operate a switch of the RX end based on an operation period of the switch of the TX end that repeatedly performs charging and discharging.

To receive power or data from the TX end without an error, the RX end may need to know when the switch of the TX end is turned off, when the switch of the TX end is turned on, when a mutual resonance is started, and when energy stored in a target resonator includes a peak value. An method of acquiring information regarding an on/off time of the switch of the TX end, and of adjusting an on/off time of the switch of the RX end based on the acquired information, may be referred to as time synchronization.

To transfer information, the RI system may use a mutual resonance phenomenon between the source resonator and the target resonator. For example, the TX end may perform an operation in which energy is supplied from a power source to the source resonator for a predetermined time interval to induce the mutual resonance phenomenon to occur for the predetermined time interval. The TX end may further perform an operation in which energy is not supplied from the power source to the source resonator for the predetermined time interval to induce a phenomenon in which the mutual resonance does not occur for the predetermined time interval. The TX end may further assign information to each of the phenomena. For example, the TX end may assign a bit "1" to the mutual resonance phenomenon, and may assign a bit "0" to the phenomenon in which the mutual resonance does not occur. The predetermined time interval may be, for example, a single symbol.

The RX end may perform an operation in which a resonant frequency of the target resonator is matched to a resonant frequency of the source resonator to induce the mutual resonance phenomenon to occur for the predetermined time interval. The RX end may further perform an operation in which the resonant frequency of the target resonator is not matched to the resonant frequency of the source resonator to induce the phenomenon in which the mutual resonance does not occur for the predetermined time interval. The RX end may further assign information to each of the phenomena. For example, the RX end may assign a bit "1" to the mutual resonance phenomenon, and may assign a bit "0" to the phenomenon in which the mutual resonance does not occur.

In a scheme of transferring information in a symbol unit, symbols may need to be synchronized first. To synchronize symbols, the RX end or the TX end may perform synchronization matching. For example, when the synchronization matching is performed in the RX end or the TX end, data may be bidirectionally transmitted between the TX end and the RX end based on a protocol that is set in advance.

Figure 3:
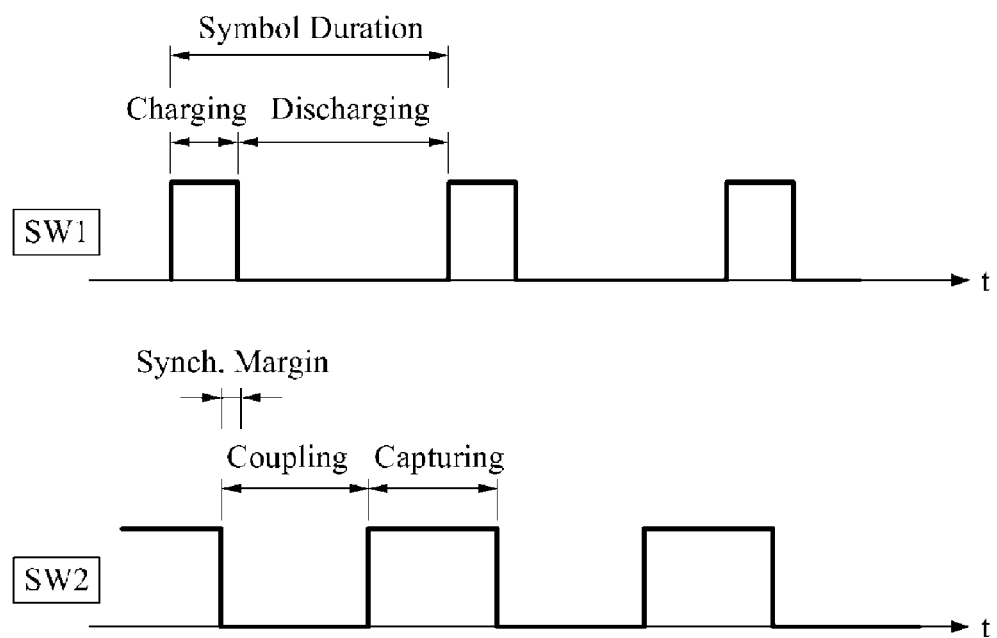
FIG. 3 is a diagram illustrating an example of an operation timing of a switch of each of a transmission (TX) end and a reception (RX) end in a wireless power transmission system.

FIG. 3 is a diagram illustrating an example of an operation timing of a switch of each of a TX end and an RX end in a wireless power transmission system. Referring to FIG. 3, the TX end transmits energy to the RX end by repeatedly charging and discharging a source resonator of the TX end with the energy through a connection to and an operation of a switch SW1 of the TX end. In more detail, the switch SW1 is disposed between a power source that supplies the energy to the source resonator and the source resonator, connects the source resonator and the power source to charge the source resonator, and disconnects the source resonator and the power source to discharge the source resonator and induce a mutual resonance with the TX end. In various examples herein, a single charge and discharge of energy may be in a single symbol duration.

To receive energy from the TX end, the RX end turns off a switch SW2 of the RX end to isolate a target resonator of the RX end, so that the mutual resonance occurs with the TX end, prior to a predetermined time (namely, a synchronization margin) in which the charging of the source resonator is switched to the discharging of the source resonator due to turning off of the switch SW1. When the mutual resonance is started, the target resonator is charged with energy. The mutual resonance is referred to as coupling between the source resonator and the target resonator. The RX end further turns on the switch SW2 to be connected to the target resonator at a point in time in which the energy stored in the target resonator includes a peak value, which changes a resonant frequency of the target resonator to be different from a resonant frequency of the source resonator, to capture the energy stored in the target resonator. Accordingly, the RX end performs synchronization matching with the switch SW1, by controlling an on/off time point of the switch SW2 based on a value of the energy stored in the target resonator.

A large portion of an operation and a performance of an RI system that transmits energy and data may be determined by a switching circuit or switch. For example, in order to increase an amount of power to be transmitted from a source resonator to a target resonator, a sufficiently large amount of current may need to be passed to the source resonator while the switch is closed to connect the source resonator to a power source. In addition, complete electrical separation of both ends of the switch may be needed while the switch is opened to disconnect the source resonator from the power source. Further, for rapid data transmission, a transient time used to turn the switch on and off may need to be sufficiently short.

When a large amount of energy is injected into the source resonator, an amplitude of a signal resonating in the source resonator may increase. In order to block a signal with a high amplitude, the power source applying power to the switch may need to apply a voltage of a high amplitude. Hence, a complexity of the system may increase, and a power consumption may also increase.

The switch may be implemented by a complementary metal oxide semiconductor (CMOS). V+ power supply, V− power supply, and $V_{IN}$ of the switch implemented by the CMOS may be changed based on an amplitude of each of an input signal and an output signal of the switch. For example, in order to power the switch on and off in response to each of the input and output signals including an amplitude ranging from about −10 volts (V) to about +10 V, the V+ power supply greater than or equal to about +10 V, the V− power supply less than or equal to about −10 V, and the $V_{IN}$ greater than or equal to 10 V may be needed.

Figure 4:
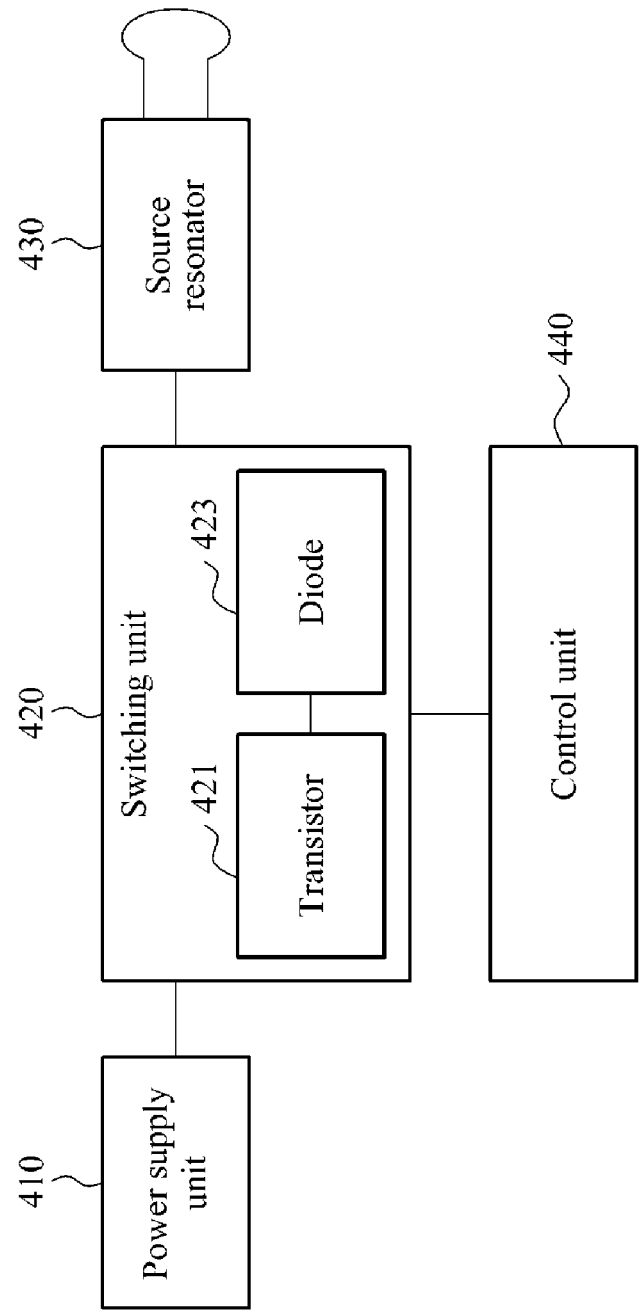
FIG. 4 is a block diagram illustrating an example of a wireless power transmission apparatus.

FIG. 4 is a block diagram illustrating an example of a wireless power transmission apparatus. Referring to FIG. 4, the wireless power transmission apparatus includes a power supply unit 410, a switching unit 420, a source resonator 430, and a control unit 440. The switching unit 420 includes a transistor 421 and a diode 423.

The power supply unit 410 supplies power to the source resonator 430. The power supply unit 410 may supply, to the source resonator 430, a DC voltage or a DC current. The power supply unit 410 supplies the power to the source resonator 430 when the power supply unit 410 is connected to the source resonator 430 through the switching unit 420.

The switching unit 420 connects the power supply unit 410 to the source resonator 430 based on a control signal. In more detail, the switching unit 420 is turned on or off in response to the control signal. When the switching unit 420 is turned on, the switching unit 420 may connect the power supply unit 410 to the source resonator 430. When the switching unit 420 is turned off, the switching unit 420 may disconnect the power supply unit 410 from the source resonator 430. A value (e.g., amplitude) of the control signal used to turn the switching unit 420 on or off may be set to be varied based on on a type of the transistor 421.

The transistor 421 may be connected in series to the diode 423. The diode 423 may be positioned at a front end or a back end of the transistor 421. Although the switching unit 420 is used for the wireless power transmission apparatus of FIG. 4, the switching unit 420 may also be used for a wireless power reception apparatus.

The transistor 421 is turned on to connect the power supply unit 410 to the source resonator 430, or is turned off to disconnect the power supply unit 410 from the source resonator 430, based on a result of comparing the value of the control signal to a predetermined reference value. In more detail, based on the type of the transistor 421, the transistor 421 may be turned on when the value of the control signal is less than the reference value, or may be turned on when the value of the control signal is greater than or equal to the reference value. In addition, based on the type of the transistor 421, the transistor 421 may be turned off when the value of the control signal is greater than or equal to the reference value, or may be turned off when the value of the control signal is less than the reference value.

The transistor 421 and the diode 423 pass a DC signal of the power supply unit 410 while the transistor 421 is turned on. The transistor 421 and the diode 423 block an inflow of an alternating current (AC) signal from the source resonator 430 while the transistor 421 is turned off.

In more detail, while the transistor 421 is turned off, a self-resonance and/or a mutual resonance may occur in the source resonator 430, and the source resonator 430 generates the AC signal. The AC signal may include, for example, an AC current signal and an AC voltage signal. When a positive component of the AC current signal of the source resonator 430 is applied to the diode 423, the diode 423 blocks the positive component of the AC current signal, which prevents an inflow of the positive component of the AC current signal in a direction of the transistor 421. In addition, when a negative component of the AC current signal of the source resonator 430 is applied to the diode 423, the transistor 421 blocks the negative component of the AC current signal, which prevents an inflow of the negative component of the AC current signal in the direction of the transistor 421. Accordingly, complete electric separation of both ends of the transistor 421 may be achieved.

The source resonator 430 transmits the power to a target resonator of a wireless power reception apparatus through the mutual resonance with the target resonator.

The control unit 440 generates the control signal, and controls the amplitude (e.g., value) and a period of the control signal. The control unit 440 controls the amplitude of the control signal to correspond to an amplitude needed to turn the transistor 421 on or off. In addition, while the transistor 421 is turned on, the control unit 440 may adjust the amplitude of the control signal to adjust (e.g., based on) an amount of the power to be transferred from the power supply unit 410 to the source resonator 430. In more detail, if the amplitude of the control unit is adjusted, a thickness of a channel via which a current is moved in the transistor 421 may be adjusted, and a resistance of the transistor 421 may be changed. If the resistance of the transistor 421 is changed, the amount of the power to be transferred from the power supply unit 410 to the source resonator 430 may be adjusted. For example, when the transistor 421 is of a metal oxide semiconductor type, the control unit 440 may adjust an amplitude of a voltage to be applied to a gate of the transistor 421, thereby adjusting the amount of the power to be transferred from the power supply unit 410 to the source resonator 430.

The control unit 440 controls the period of the control signal based on the amount of the power to be transferred from the power supply unit 410 to the source resonator 430. For example, in order to increase the amount of the current to be transferred from the power supply unit 410 to the source resonator 430, the control unit 440 increases the period of the control signal used to turn the transistor 421 on. The control signal may include, for example, a pulse waveform or a square waveform. Conversely, in order to decrease the amount of the power to be transferred from the power supply unit 410 to the source resonator 430, the control unit 440 decreases the period of the control signal used to turn the transistor 421 on.

In an example, if the transistor 421 is an P-channel metal oxide semiconductor (PMOS), the control signal may be applied to a gate of the PMOS. The control signal may be a voltage signal. If a voltage of the control signal applied to the gate of the PMOS is less than or equal to a difference between a voltage applied to a source of the PMOS and a threshold voltage of the PMOS, the PMOS may be turned on to connect the power supply unit 410 to the source resonator 430. If the voltage of the control signal applied to the gate of the PMOS is greater than the difference between the voltage applied to the source of the PMOS and the threshold voltage of the PMOS, the PMOS may be turned off to disconnect the power supply unit 410 from the source resonator 430.

That is, a reference value used to turn the PMOS on or and off may be the difference between the voltage applied to the source of the PMOS and the threshold voltage of the PMOS. If the voltage of the control signal applied to the gate of the PMOS is less than or equal to the reference value, the PMOS may be turned on. If the voltage of the control signal applied to the gate of the PMOS is greater than the reference value, the PMOS may be turned off.

Since a switch may need a bias voltage greater than a voltage of an input and output signal, and a driving voltage greater than the voltage of the input and output signal, the transistor 421 may be turned on or off based on whether the voltage of the control signal is greater than or less than the reference value. Accordingly, the voltage of the control signal may be insensitive to an effect of the input and output signal, and a high voltage may be unnecessary.

The diode 423 may be connected in series to the PMOS. The diode 423 may be connected in series to the source of the PMOS, or may be connected to a drain of the PMOS.

The PMOS and the diode 423 may pass the DC current signal supplied by the power supply unit 410 while the PMOS is turned on. Transitively, the diode 423 may be forward-biased while the PMOS is turned on.

The PMOS and the diode 423 may block the inflow of the AC current signal from the source resonator 430 while the PMOS is turned off. In more detail, the source resonator 430 may generate the AC current signal while the PMOS is turned off. The diode 423 may block the inflow of the positive component of the AC current signal, and the PMOS may block the inflow of the negative component of the AC current signal. Transitively, the diode 423 may be reverse-biased while the PMOS is turned off.

In another example, if the transistor 421 is an N-channel metal oxide semiconductor (NMOS), the control signal may be applied to a gate of the NMOS. The control signal may be a voltage signal.

If a voltage of the control signal applied to the gate of the NMOS is greater than or equal to a sum of a voltage applied to a source of the NMOS and a threshold voltage of the NMOS, the NMOS may be turned on to connect the power supply unit 410 to the source resonator 430. In addition, if the voltage of the control signal applied to the gate of the NMOS is greater than or equal to a sum of a voltage applied to a drain of the NMOS and the threshold voltage of the NMOS, the NMOS may be turned on to connect the power supply unit 410 to the source resonator 430.

If the voltage of the control signal applied to the gate of the NMOS is less than the sum of the voltage applied to the source of the NMOS and the threshold voltage of the NMOS, the NMOS may be turned off to disconnect the power supply unit 410 from the source resonator 430. In addition, if the voltage of the control signal applied to the gate of the NMOS is less than the sum of the voltage applied to the drain of the NMOS and the threshold voltage of the NMOS, the NMOS may be turned off to disconnect the power supply unit 410 from the source resonator 430.

That is, a reference value used to turn the NMOS on or off may be the sum of the voltage applied to the source of the NMOS and the threshold voltage of the NMOS, or the sum of the voltage applied to the drain of the NMOS and the threshold voltage of the NMOS. If the voltage of the control signal applied to the gate of the NMOS is greater than or equal to the reference value, the NMOS may be turned on. If the voltage of the control signal applied to the gate of the NMOS is less than the reference value, the NMOS may be turned off.

The diode 423 may be connected in series to the NMOS. The diode 423 may be connected in series to the source of the NMOS, or may be connected to the drain of the NMOS.

The NMOS and the diode 423 may pass the DC current signal supplied by the power supply unit 410 while the NMOS is turned on. While the NMOS is turned on, the diode 423 may be forward-biased.

The NMOS and the diode 423 may block the inflow of the AC current signal from the source resonator 430 while the NMOS is turned off. In more detail, while the NMOS is turned off, the source resonator 430 may generate the AC current signal. The diode 423 may block the inflow of the positive component of the AC current signal, and the NMOS may block the inflow of the negative component of the AC current signal. While the NMOS is turned off, the diode 423 may be reverse-biased.

In still another example, if the transistor 421 is a bipolar junction transistor (BJT), the BJT may be turned on to connect the power supply unit 410 to the source resonator 430, or may be turned off to disconnect the power supply unit 410 from the source resonator 430, based on a current of the control signal applied to a base of the BJT. The diode 423 may be connected in series to the BJT. The diode 423 may be connected in series to a collector of the BJT, or may be connected in series to an emitter of the BJT.

The BJT and the diode 423 may pass the DC current signal supplied by the power supply unit 410 while the BJT is turned on. While the BJR is turned on, the diode 423 may be forward-biased.

The BJT and the diode 423 may block the inflow of the AC current signal from the source resonator 430 while the BJT is turned off. In more detail, while the BJT is turned off, the source resonator 430 may generate the AC current signal. The diode 423 may block the inflow of the positive component of the AC current signal, and the BJC may block the inflow of the negative component of the AC current signal. While the BJR is turned off, the diode 423 may be reverse-biased.

Figure 5:
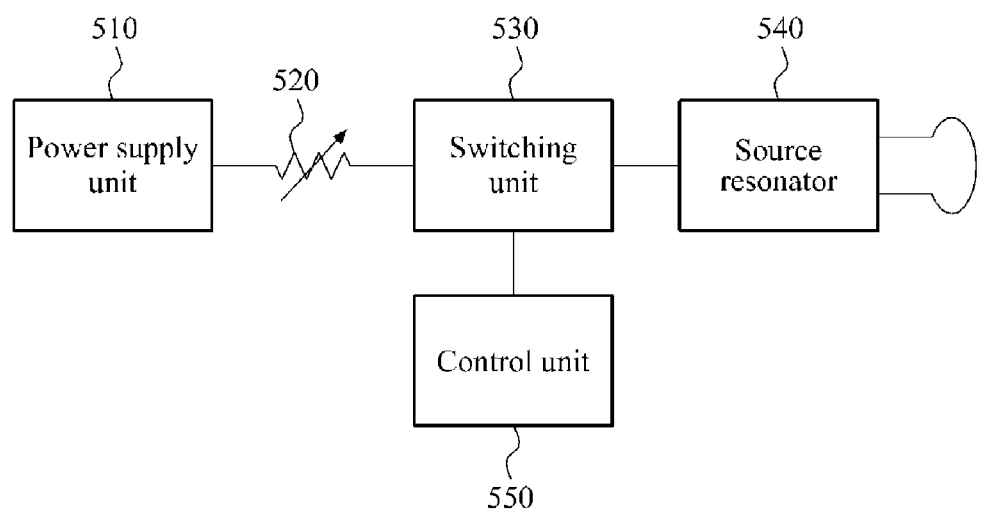
FIG. 5 is a block diagram illustrating another example of a wireless power transmission apparatus.

FIG. 5 is a block diagram illustrating another example of a wireless power transmission apparatus. Referring to FIG. 5, the wireless power transmission apparatus includes a power supply unit 510, a variable resistor 520, a switching unit 530, a source resonator 540, and a control unit 550.

The power supply unit 510, the switching unit 530, the source resonator 540, and the control unit 550 may correspond to the power supply unit 410, the switching unit 420, the source resonator 430, and the control unit 440, respectively, of FIG. 4. Accordingly, description of the power supply unit 510, the switching unit 530, the source resonator 540, and the control unit 550 is made with reference to FIG. 4 for conciseness.

The variable resistor 520 is disposed between the power supply unit 510 and the switching unit 530. An amount of current to be supplied from the power supply unit 510 to the source resonator 540 is adjusted based on a value of the variable resistor 520. The control unit 550 may determine and set the value of the variable resistor 520 based on the amount of the current to be supplied from the power supply unit 510 to the source resonator 540.

Figure 6:
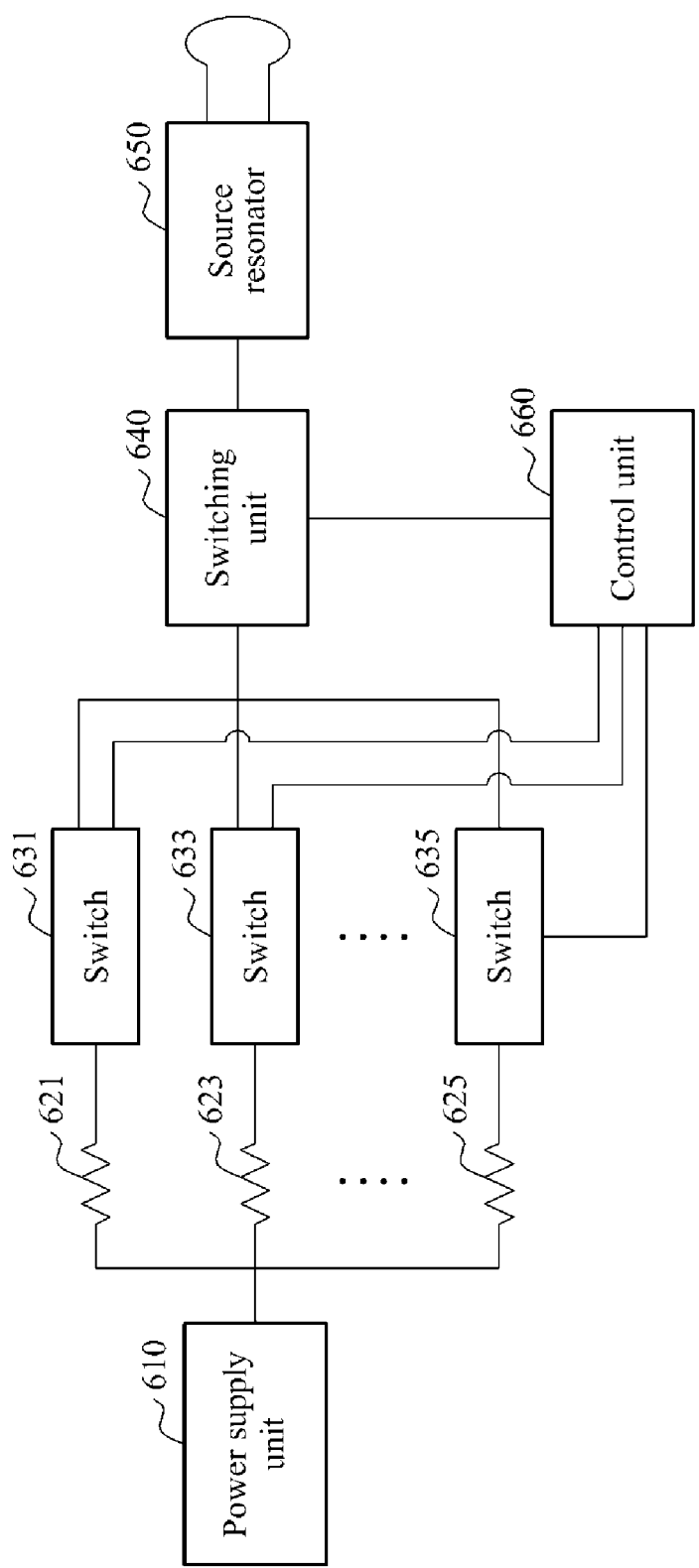
FIG. 6 is a block diagram illustrating still another example of a wireless power transmission apparatus.

FIG. 6 is a block diagram illustrating still another example of a wireless power transmission apparatus. Referring to FIG. 6, the wireless power transmission apparatus includes a power supply unit 610, resistors 621, 623, and 625, switches 631, 633, and 635, a switching unit 640, a source resonator 650, and a control unit 660.

The power supply unit 610, the switching unit 640, the source resonator 650, and the control unit 660 may correspond to the power supply unit 410, the switching unit 420, the source resonator 430, and the control unit 440, respectively, of FIG. 4. Accordingly, description of the power supply unit 610, the switching unit 640, the source resonator 650, and the control unit 660 is made with reference to FIG. 4 for conciseness.

The resistors 621, 623, and 625 are connected in parallel to the power supply unit 610. The switches 631, 633, and 635 are connected in series to the resistors 621, 623, and 625, respectively. An amount of current to be supplied from the power supply unit 610 to the source resonator 650 is adjusted based on a number of resistors connected to the switching unit 640, among the resistors 621, 623, and 625. The resistors 621, 623, and 625 may include identical resistances, or may include different resistances. The control unit 660 determines one or more resistors to be connected to the switching unit 640, among the resistors 621, 623, and 625. The control unit 660 controls the switches 631, 633, and 635 to connect and/or disconnect the resistors 621, 623, and 625, respectively, to the switching unit 640. For example, the control unit 660 may turn on the switches 631, 633, and/or 635 to connect the resistors 621, 623, and/or 625, respectively, to the switching unit 640, and may turn off the switches 631, 633, and/or 635 to disconnect the resistors 621, 623, and/or 625, respectively, to the switching unit 640.

Figure 7:
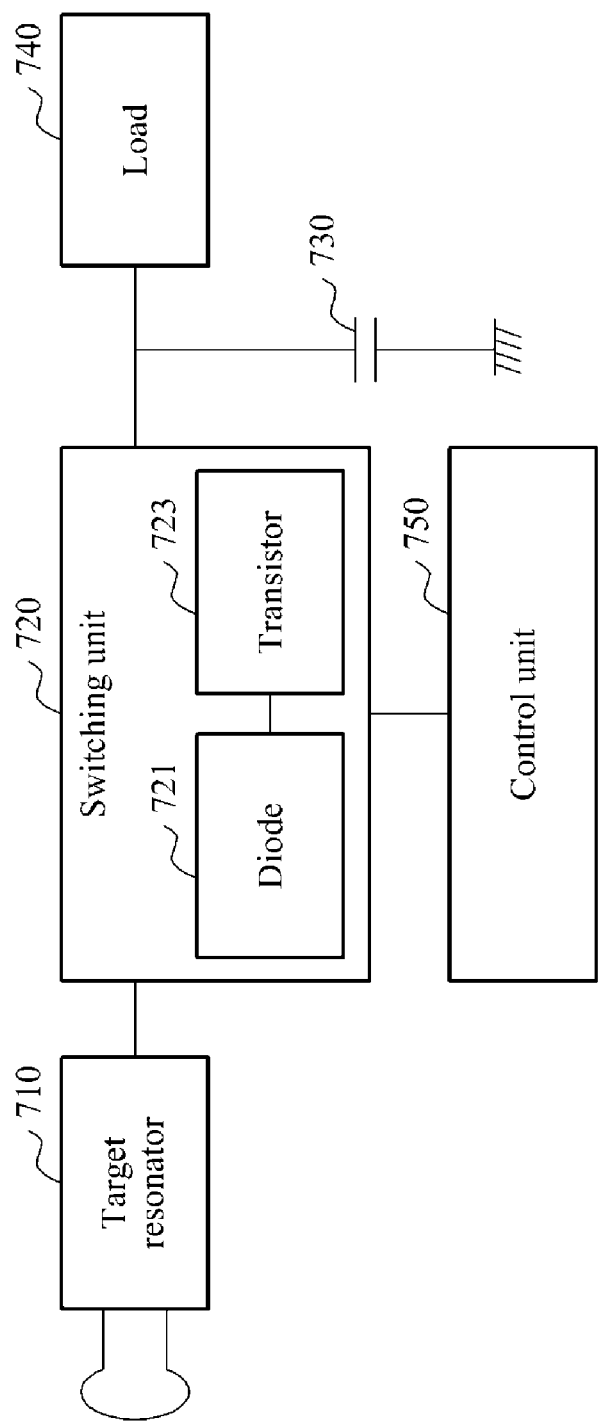
FIG. 7 is a block diagram illustrating an example of a wireless power reception apparatus.

FIG. 7 is a block diagram illustrating an example of a wireless power reception apparatus. Referring to FIG. 7, the wireless power reception apparatus includes a target resonator 710, a switching unit 720, a capacitor 730, a load 740, and a control unit 750. The switching unit 720 includes a diode 721 and a transistor 723.

The target resonator 710 receives power from a source resonator of a wireless power transmission apparatus through a mutual resonance with the source resonator. When a resonant frequency of the target resonator 710 coincides with a resonant frequency of the source resonator, the mutual resonance occurs.

The switching unit 720 connects the target resonator 710 to the load 740 based on a control signal. The switching unit 720 is turned on or off in response to the control signal. When the switching unit 720 is turned on, the diode 721 is connected to the transistor 723. When the switching unit 720 is turned off, the diode 721 is disconnected from the transistor 723. A value (e.g., amplitude) of the control signal may be set to be varied based on a type of the transistor 723.

The transistor 723 may be connected in series to the diode 721. The diode 721 may be positioned at a front end or a back end of the transistor 723.

The transistor 723 and the diode 721 pass a DC signal based on an AC signal from the target resonator 710 while the transistor 723 is turned on, and block an inflow of the AC signal from the target resonator 710 while the transistor 723 is turned off. In more detail, while the transistor 723 is turned on, the diode 721 rectifies the AC signal generated by the target resonator 710 to generate the DC signal, and the transistor 723 passes the DC signal. The passed DC signal may be transferred to the load 740 to charge the load 740. In addition, the passed DC signal may be stored in the capacitor 730, and the capacitor 730 may stably transfer the power to the load 740.

While the transistor 723 is turned off, the target resonator 710 receives the power from the source resonator through the mutual resonance. When the mutual resonance occurs, the target resonator 710 generates the AC signal, which may include, for example, an AC current signal and an AC voltage signal. When a positive component of the AC current signal of the target resonator 710 is applied to the diode 721, the transistor 723 is turned off to block the positive component of the AC current signal, which prevents an inflow of the positive component of the AC current signal in a direction of the transistor 723. In addition, when a negative component of the AC current signal of the target resonator 710 is applied to the diode 721, the diode 721 blocks the negative component of the AC current signal, which prevents an inflow of the negative component of the AC current signal in the direction of the transistor 723. Accordingly, while the transistor 723 is turned off, complete separation of both ends of the transistor 723 may be achieved.

The transistor 723 is turned on to connect the target resonator 710 to the load 740, or is turned off to disconnect the target resonator 710 from the load 740, based on a result of comparing the value of the control signal to a reference value. In more detail, based on the type of the transistor 723, the transistor 723 may be turned on when the value of the control signal is less than the reference value, or may be turned on when the value of the control signal is greater than or equal to the reference value. In addition, based on the type of the transistor 723, the transistor 723 may be turned off when the value of the control signal is greater than or equal to the reference value, or may be turned off when the value of the control signal is less than the reference value.

The capacitor 730 changes the resonant frequency of the target resonator 710 when the capacitor 730 is connected to the target resonator 710. In more detail, the transistor 723 is turned on to connect the target resonator 710 to the capacitor 730, or is turned off to disconnect the target resonator 710 from the capacitor 730, based on the result of the comparing of the value of the control signal to the reference value. When the target resonator 710 is connected to the capacitor 730, the capacitor 730 changes the resonant frequency of the target resonator 710 since the resonant frequency of the target resonator 710 is determined based on an inductance and a capacitance of the target resonator 710, and the capacitance is changed when the target resonator 710 is connected to the capacitor 730. Accordingly, the mutual resonance between the target resonator 710 and the source resonator is terminated.

The load 740 receives the power from the target resonator 710 when the load 740 is connected to the target resonator 710. The load 740 may receive a DC power from power stored in the capacitor 730. A rated voltage needed for the load 740 may be adjusted by adjusting a capacity of the capacitor 730.

The control unit 750 generates control signal, and controls the amplitude (e.g., value) and a period of the control signal. The control unit 750 controls the amplitude of the control signal to correspond to an amplitude needed to turn the transistor 723 on or off. In addition, while the transistor 723 is turned on, the control unit 750 may adjust the amplitude of the control signal to adjust (e.g., based on) an amount of power to be transferred from the target resonator 710 to the load 740. In more detail, if the amplitude of the control unit is adjusted, a thickness of a channel via which a current is transferred in the transistor 723 may be adjusted, and a resistance of the transistor 723 may be changed. If the resistance of the transistor 723 is changed, the amount of the power to be transferred from the target resonator 710 to the load 740 may be adjusted.

In addition, the control unit 750 may control the period of the control signal based on the amount of the power to be transferred from the target resonator 710 to the load 740. For example, in order to increase the amount of the power to be transferred from the target resonator 710 to the load 740, the control unit 750 may increase the period of the control signal used to turn the transistor 723 on. Conversely, in order to decrease the amount of the power to be transferred from the target resonator 710 to the load 740, the control unit 750 may decrease the period of the control signal used to turn the transistor 723 on.

Further, the control unit 750 may control the period of the control signal based on an amount of energy stored in the load 740. For example, if the amount of the energy stored in the load 740 satisfies a charging capacity, the control unit 750 may increase the period of the control signal used to turn the transistor 723 off. The control signal may include, for example, a pulse waveform or a square waveform.

In an example, if the transistor 723 is an NMOS, the control signal may be applied to a gate of the NMOS. The control signal may be a voltage signal.

If a voltage of the control signal applied to the gate of the NMOS is greater than or equal to a sum of a voltage applied to a source of the NMOS and a threshold voltage of the NMOS, the NMOS may be turned on to connect the target resonator 710 to the load 740. If the voltage of the control signal applied to the gate of the NMOS is less than the sum of the voltage applied to the source of the NMOS and the threshold voltage of the NMOS, the NMOS may be turned off to disconnect the target resonator 710 from the load 740.

That is, a reference value used to turn the NMOS on or off may be the sum of the voltage applied to the source of the NMOS and the threshold voltage of the NMOS, or a sum of a voltage applied to a drain of the NMOS and the threshold voltage of the NMOS. Accordingly, if the voltage of the control signal applied to the gate of the NMOS is greater than or equal to the reference value, the NMOS may be turned on. If the voltage of the control signal applied to the gate of the NMOS is less than the reference value, the NMOS may be turned off.

Since a switch may need a bias voltage greater than a voltage of an input and output signal, and a driving voltage greater than the voltage of the input and output signal, the transistor 723 may be turned on or off based on whether the voltage of the control signal is greater than or less than the reference value. Accordingly, the voltage of the control signal may be insensitive to an effect of the input and output signal, and a high voltage may be unnecessary.

The diode 721 may be connected in series to the NMOS. The diode 721 may be connected in series to the source of the NMOS, or may be connected to the drain of the NMOS.

The NMOS and the diode 721 may pass the DC current signal from the target resonator 710 while the NMOS is turned on. The NMOS and the diode 721 may block the inflow of the AC current signal from the target resonator 710 while the NMOS is turned off. In more detail, while the NMOS is turned off, the target resonator 710 may generate the AC current signal due to the mutual resonance and/or a self-resonance. The diode 721 may block the inflow of the negative component of the AC current signal, and the NMOS may block the inflow of the positive component of the AC current signal.

In another example, if the transistor 723 is an PMOS, the control signal may be applied to a gate of the PMOS. The control signal may be a voltage signal.

If a voltage of the control signal applied to the gate of the PMOS is less than or equal to a difference between a voltage applied to a source of the PMOS and a threshold voltage of the PMOS, the PMOS may be turned on to connect the target resonator 710 to the load 740. If the voltage of the control signal applied to the gate of the PMOS is greater than the difference between the voltage applied to the source of the PMOS and the threshold voltage of the PMOS, the PMOS may be turned off to disconnect the target resonator 710 from the load 740.

That is, a reference value used to turn the PMOS on or off may be the difference between the voltage applied to the source of the PMOS and the threshold voltage of the PMOS. Accordingly, if the voltage of the control signal applied to the gate of the PMOS is less than or equal to the reference value, the PMOS may be turned on. If the voltage of the control signal applied to the gate of the PMOS is greater than the reference value, the PMOS may be turned off.

The diode 721 may be connected in series to the PMOS. The diode 721 may be connected in series to the source of the PMOS, or may be connected to a drain of the PMOS.

The PMOS and the diode 721 may pass the DC current signal from the target resonator 710 while the PMOS is turned on. The PMOS and the diode 721 may block the inflow of the AC current signal from the target resonator 710 while the PMOS is turned off. In more detail, while the PMOS is turned off, the target resonator 710 generates the AC current signal due to the mutual resonance and/or the self-resonance. The diode 721 blocks the inflow of the negative component of the AC current signal, and the PMOS blocks the inflow of the positive component of the AC current signal.

In still another example, if the transistor 723 is an BJT, the BJT may be turned on to connect the target resonator 710 to the load 740, or may be turned off to disconnect the target resonator 710 from the load 740, based on a current of the control signal applied to a base of the BJT. The diode 721 may be connected in series to the BJT. The diode 721 may be connected in series to a collector of the BJT, or may be connected in series to an emitter of the BJT.

The BJT and the diode 721 may pass the DC current signal from the target resonator 710 while the BJT is turned on. The BJT and the diode 721 may block the inflow of the AC current signal from the target resonator 710 while the BJT is turned off. In more detail, while the BJT is turned off, the target resonator 710 generates the AC current signal due to the mutual resonance and/or the self-resonance. The diode 721 blocks the inflow of the negative component of the AC current signal, and the BJT blocks the inflow of the positive component of the AC current signal.

Figure 8:
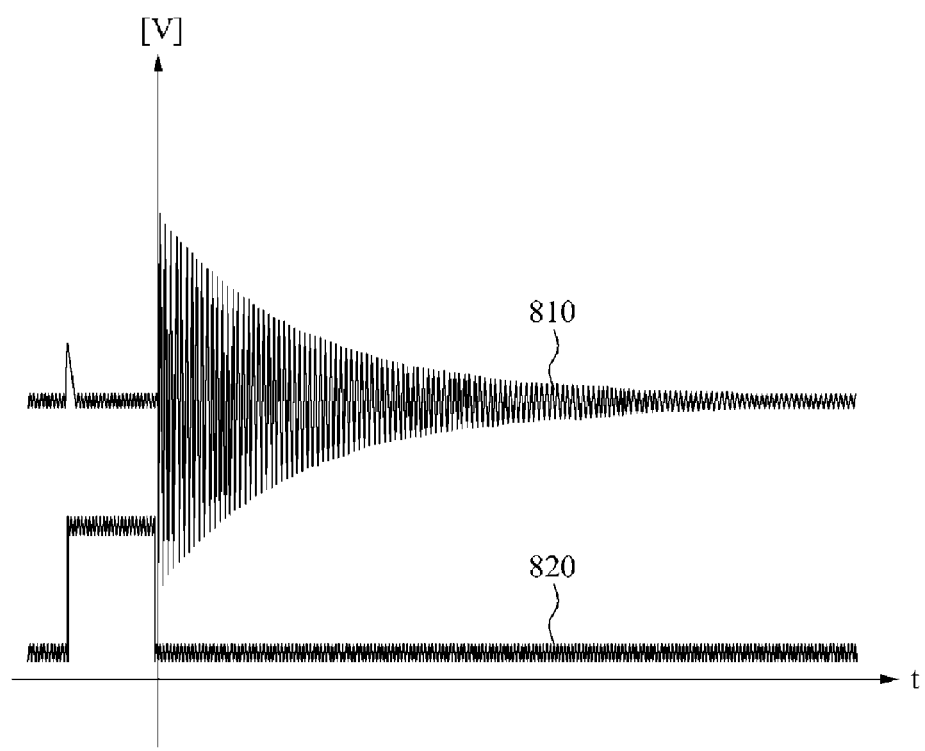
FIG. 8 is a graph illustrating an example of a change in voltage applied to a source resonator, and an example of an operation of a switching unit in a wireless power transmission apparatus.

FIG. 8 is a graph illustrating an example of a change in voltage applied to a source resonator, and an example of an operation of a switching unit in a wireless power transmission apparatus. Referring to FIG. 8, a signal waveform 820 denotes a control signal applied to the switching unit, and a signal waveform 810 denotes a voltage waveform of the source resonator. When the control signal (e.g., the signal waveform 820) is in a high state, the switching unit is turned on. When the control signal (e.g., the signal waveform 820) is in a low state, the switching unit is turned off.

When the switching unit is turned on, a current is supplied from a power source to the source resonator, and an inductor of the source resonator is charged with energy in a form of a magnetic field. In order to store a large amount of the energy in the source resonator, an amount of the current tolerable by the switching unit, namely, a maximum amount of the current, may be relatively large. When the switching unit is turned off, a self-resonance occurs in the inductor and a capacitor that constitute the source resonator.

When the large amount of the energy is stored in the source resonator as a result of an inflow of a large amount of the current while the switching unit is turned on, and when the switching unit is turned off, an amplitude of the voltage waveform (e.g., the signal waveform 810) of the source resonator increases. Accordingly, if a typical CMOS-based switch is used, a V+ and V− power supply of a large value may be needed to turn the switching unit off effectively. The use of the power supply may increase a power consumption of a system, and may also increase a complexity of a circuit.

Figure 9:
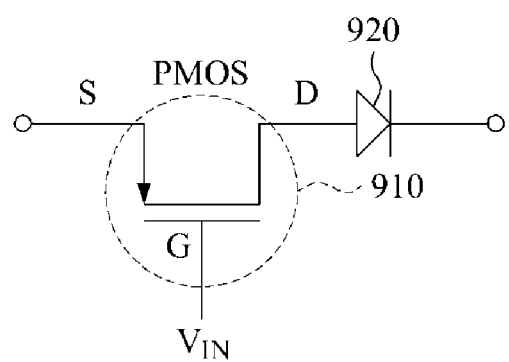
FIG. 9 is a diagram illustrating an example of a switching structure.

FIG. 9 is a diagram illustrating an example of a switching structure. When the switching structure is used, a switch may be turned off using a relatively low voltage of a control signal, without necessity of a V+ and V− power supply of a high value, contrary to an example of using a typical CMOS-based switch.

Referring to FIG. 9, the switching structure includes a PMOS 910 and a diode 920. Although the diode 920 is connected to a drain end D of the PMOS 910 in FIG. 9, the diode 920 may be connected to a source end S of the PMOS 910 as another example. In addition, the switching structure may be used in a wireless power transmission apparatus that transmits power wirelessly, and a wireless power reception apparatus that receives power wirelessly.

When a voltage $V_{IN}$ less than a difference between a voltage applied to the source end S and a threshold voltage of the PMOS 910 is applied to a gate end G of the PMOS 910, the PMOS 910 is turned on. When a potential difference $V_{GS}$ of the gate end G and the source end S is greater than the threshold voltage, the PMOS 910 is turned off, irrespective of an amplitude of a signal applied to a back end of the diode 920. When the PMOS 910 is turned off, the diode 920 blocks an inflow of a positive component of an AC current signal of a reverse direction, due to a reverse bias, and the PMOS 910 blocks an inflow of a negative component of the AC current signal. Accordingly, when the switching structure is used, the switching structure may pass a signal of a high amplitude, and may block an inflow of the signal of the high amplitude, in response to the control signal including a relatively low driving voltage.

Figure 10:
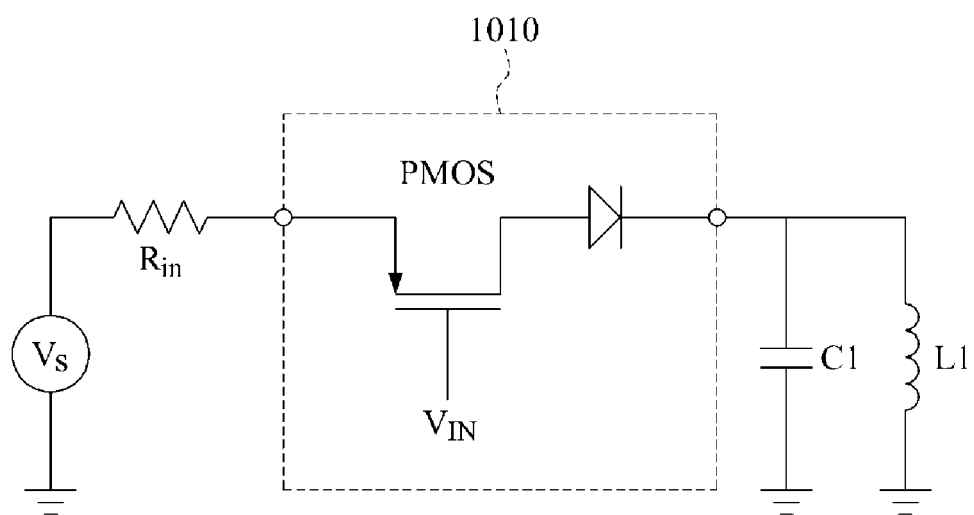
FIG. 10 is a diagram illustrating an example of a switching structure used in a wireless power transmission apparatus.

FIG. 10 is a diagram illustrating an example of a switching structure 1010 used in a wireless power transmission apparatus. FIG. 10 is a circuit diagram in which the switching structure 1010 corresponding to the switching structure of FIG. 9 is applied to the wireless power transmission apparatus. If a threshold voltage of a PMOS is 1 V, the PMOS may be turned on when a voltage $V_{IN}$ applied to a gate end is less than a voltage $V_S$ applied to a source end by 1 V. If the voltage $V_S$ is greater than 1 V, the PMOS may be turned on although the voltage $V_{IN}$ is 0 V.

If the voltage $V_{IN}$ is greater than $V_S$−1, the PMOS may be turned off irrespective of an amplitude of a signal applied to a back end of a diode, within a range of a breakthrough voltage of the diode and the PMOS. When the PMOS is turned off, the diode and the PMOS may block an inflow of an AC current signal occurring in a source resonator disposed at the back end of the diode.

Figure 11:
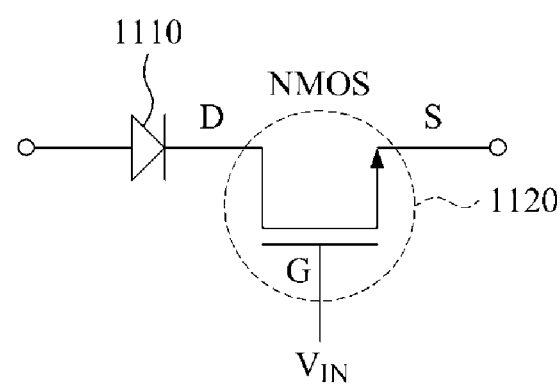
FIG. 11 is a diagram illustrating another example of a switching structure.

FIG. 11 is a diagram illustrating another example of a switching structure. When the switching structure of FIG. 11 is used, a switch may be turned off using a relatively low voltage of a control signal, without a need for a relatively high value of a V+ and V− power supply, as opposed to an example of using a typical CMOS-based switch.

Referring to FIG. 11, the switching structure includes a diode 1110 and an NMOS 1120. Although the diode 1110 is connected to a drain end D of the NMOS 1120 in FIG. 11, the diode 1110 may be connected to a source end S of the NMOS 1120, as another example. In addition, the switching structure may be used in a wireless power reception apparatus that receives power wirelessly, and a wireless power transmission apparatus that transmits power wirelessly.

Unless a voltage $V_{IN}$ greater than or equal to a threshold voltage of the NMOS 1120 is applied to a gate end G of the NMOS 1120, rather than the drain end D or the source end S, the NMOS 1120 is turned off. When the NMOS 1120 is turned off, the diode 1110 blocks an inflow of a negative component of an AC current signal, and the NMOS 1120 blocks an inflow of a positive component of the AC current signal may be blocked by the NMOS 1120. When the voltage $V_{IN}$ greater than or equal to the threshold voltage is applied to the gate end G, rather than the drain end D or the source end S, the NMOS 1120 is turned on. When the NMOS 1120 is turned on, the diode 1110 passes a DC signal, and blocks a reverse AC current signal. In addition, the diode 1110 passes a positive component of a forward AC current signal, thereby performing a rectification function. Accordingly, when the switching structure is used, the switching structure may pass a signal of a high amplitude, and may block an inflow of the signal of the high amplitude, in response to the control signal including a relatively low driving voltage.

Figure 12:
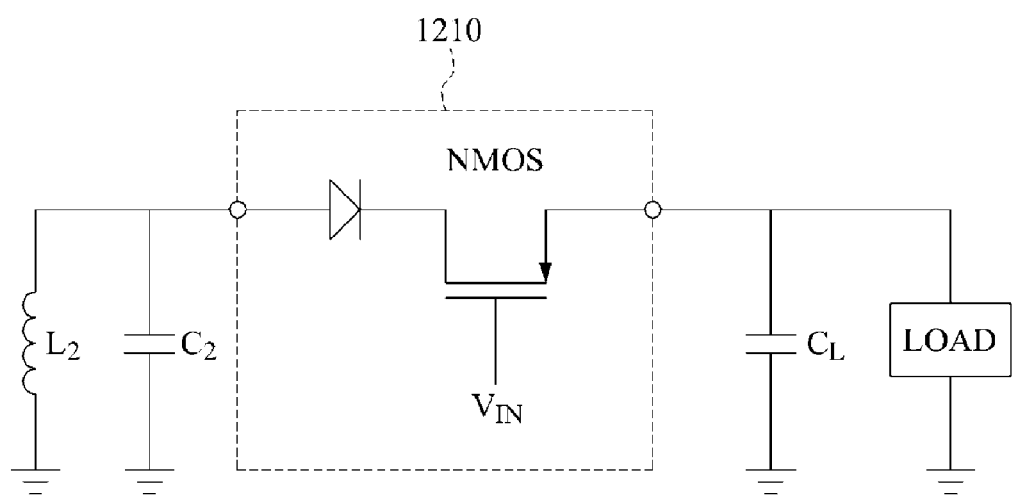
FIG. 12 is a diagram illustrating an example of a switching structure used in a wireless power reception apparatus.

FIG. 12 is a diagram illustrating an example of a switching structure 1210 used in a wireless power reception apparatus. FIG. 12 is a circuit diagram in which the switching structure 1210 corresponding to the switching structure of FIG. 11 is applied to the wireless power reception apparatus. If a voltage $V_{IN}$ of 0 V is applied to a gate end of an NMOS, the NMOS may be turned off although a target resonator (including an inductor $L_2$ and a capacitor $C_2$) of the wireless power reception apparatus generates a voltage with a high amplitude through a mutual resonance.

In addition, when the voltage $V_{IN}$ greater than or equal to a threshold voltage of the NMOS is applied to the gate end, rather than a peak voltage of an AC signal generated by the target resonator, the NMOS may be turned on. When the NMOS is turned on, the diode is forward-biased, rectifies the AC current signal generated by the target resonator disposed at a front end of the diode into a DC signal, and passes the DC signal. Although examples of using an MOS transistor are provided with reference to FIGS. 9 and 11, a switching structure may be implemented using different types of transistors, for example, a BJT.

FIG. 13 is a flowchart illustrating an example of a wireless power transmission method. Referring to FIG. 13, in operation 1310, a wireless power transmission apparatus, namely, a switching unit, turns a transistor on to connect a power supply unit to a source resonator, or turns the transistor off to disconnect the power supply unit from the source resonator, based on a result of comparing a value of a control signal applied to the transistor to a reference value. The wireless power transmission apparatus, namely, a control unit, generates the control signal, and controls an amplitude and/or a period of the control signal based on an amount of power to be supplied to the source resonator.

In operation 1320, the wireless power transmission apparatus, namely, the transistor and a diode connected in series to the transistor, passes a DC signal of the power supply unit while the transistor is turned on, and blocks an inflow of an AC signal from the source resonator while the transistor is turned off. In more detail, while the transistor is turned off, the diode blocks an inflow of a positive component of the AC current signal generated by the source resonator, and the transistor blocks an inflow of a negative component of the AC current signal.

In operation 1330, the wireless power transmission apparatus, namely, the switching unit, supplies the power from the power supply unit to the source resonator while the transistor is turned on.

In operation 1340, the wireless power transmission apparatus, namely, the source resonator, transmits the power from the source resonator to a target resonator of a wireless transmission reception apparatus through a mutual resonance with the target resonator.

The examples of a wireless power transmission apparatus described may operate a switch unit with a relatively low driving voltage, using a switching structure including a transistor and a diode. The wireless power transmission apparatus may supply a large amount of current to a source resonator, and may block an inflow of an AC current signal generated by the source resonator and including a relatively high amplitude in a direction of the transistor. The wireless power transmission apparatus may pass and block a signal of a relatively low voltage or a relatively high voltage. The switching structure may be applied to a wireless power transmission system that transmits power and data simultaneously using a mutual resonance, and needs switching of an analog signal. The wireless power transmission apparatus may operate the switch unit with a power source of a single polarity.

The various units and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a device described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmission apparatus comprising:
   a self-resonating resonator configured to transmit power to another resonator;
   a power supply unit configured to supply power to the resonator; and
   a switching unit comprising
      a transistor configured to be turned on to connect the power supply unit to the resonator, and to be turned off to disconnect the power supply unit from the resonator, based on a control signal, and
      a diode connected in series to the transistor.

2. The apparatus of claim 1, further comprising:
   a control unit configured to generate the control signal, and control an amplitude and/or a period of the control signal.

3. The apparatus of claim 2, wherein the control unit is further configured to:
   control the amplitude and/or the period of the control signal based on an amount of the power to be supplied to the resonator and an amount of energy stored in a load of the other resonator.

4. A wireless power transmission apparatus comprising:
   a resonator configured to transmit power to another resonator;
   a power supply unit configured to supply power to the resonator; and
   a switching unit comprising
      a transistor configured to be turned on to connect the power supply unit to the resonator, and to be turned off to disconnect the power supply unit from the resonator,
      a diode connected in series to transistor,
   wherein:
   the diode and the transistor are configured to pass a direct current (DC) current signal from the power supply unit in response to the transistor being turned on; and
   the diode is further configured to block an inflow of a positive component of an alternating current (AC) current signal from the resonator, and the transistor is further configured to block an inflow of a negative component of the AC current signal, in response to the transistor being turned off.

5. The apparatus of claim 1, wherein:
   the transistor comprises a P-channel metal oxide semiconductor (PMOS);
   the control signal is applied to a gate of the PMOS;
   the PMOS is configured to be turned on to connect the power supply unit to the resonator in response to a voltage of the control signal being less than or equal to a difference between a voltage applied to a source of the PMOS and a threshold voltage of the PMOS; and
   the PMOS is further configured to be turned off to disconnect the power supply unit from the resonator in response to the voltage of the control signal being greater than the difference between the voltage applied to the source of the PMOS and the threshold voltage of the PMOS.

6. The apparatus of claim 5, wherein:
   the diode and the PMOS are configured to pass a direct current (DC) current signal from the power supply unit in response to the PMOS being turned on; and
   the diode and the PMOS are further configured to block an inflow of an alternating current (AC) current signal from the resonator in response to the PMOS being turned off.

7. The apparatus of claim 1, wherein:
   the transistor comprises an N-channel metal oxide semiconductor (NMOS);
   the control signal is applied to a gate of the NMOS;
   the NMOS is configured to be turned on to connect the power supply unit to the resonator in response to a voltage of the control signal being greater than or equal to a sum of a voltage applied to a source of the NMOS and a threshold voltage of the NMOS; and
   the NMOS is further configured to be turned off to disconnect the power supply unit from the resonator in response to the voltage of the control signal being less than the sum of the voltage applied to the source of the NMOS and the threshold voltage of the NMOS.

8. The apparatus of claim 7, wherein:
the diode and the NMOS are configured to pass a direct current (DC) current signal from the power supply unit in response to the NMOS being turned on; and
the diode and the NMOS are further configured to block an inflow of an alternating current (AC) current signal from the resonator in response to the NMOS being turned off.

9. The apparatus of claim 1, wherein:
the transistor comprises a bipolar junction transistor (BJT); and
the BJT is configured to be turned on to connect the power supply unit to the resonator, or to be turned off to disconnect the power supply unit from the resonator, based on a current of the control signal applied to a base of the BJT.

10. The apparatus of claim 9, wherein:
the diode and the BJT are configured to pass a direct current (DC) current signal from the power supply unit in response to the BJT being turned on; and
the diode and the BJT are further configured to block an inflow of an alternating current (AC) current signal from a self-resonating of the resonator in response to the BJT being turned off.

11. The apparatus of claim 1, further comprising:
a variable resistor disposed between the power supply unit and the switching unit.

12. The apparatus of claim 1, further comprising:
resistors connected in parallel to the power supply unit; and
switches connected in series to the resistors, respectively.

13. A wireless power transmission method comprising:
turning a transistor on to connect a power supply unit to a self-resonating resonator, or turning the transistor off to disconnect the power supply unit from the resonator, based on a control signal, the transistor connected in series to a diode;
supplying power from the power supply unit to the resonator in response to the transistor being turned on; and
transmitting power from the resonator to another resonator.

14. The method of claim 13, further comprising:
generating the control signal; and
controlling an amplitude and/or a period of the control signal based on an amount of the power to be supplied to the resonator and an amount of energy stored in a load of the other resonator.

15. The method of claim 13, further comprising:
passing, through the diode and the transistor, a direct current (DC) current signal from the power supply unit in response to the transistor being turned on; and
blocking, by the diode and the transistor, an inflow of an alternating current (AC) current signal from a self-resonating of the resonator in response to the transistor being turned off.

16. The method of claim 15, wherein the blocking comprises:
blocking, by the diode, an inflow of a positive component of the AC current signal; and
blocking, by the transistor, an inflow of a negative component of the AC current signal.

17. A wireless power reception apparatus comprising:
a resonator configured to receive power from another resonator;
a load configured to receive power from the resonator; and
a switching unit comprising
a transistor configured to be turned on to connect the resonator to the load and to terminate mutual resonance with the other resonator, and to be turned off to disconnect the resonator from the load, based on a control signal, and
a diode connected in series to the transistor.

18. The apparatus of claim 17, wherein:
the diode and the transistor are configured to pass a direct current (DC) current signal based on an alternating current (AC) current signal from the resonator in response to the transistor being turned on; and
the diode and the transistor are further configured to block an inflow of the AC current signal in response to the transistor being turned off.

19. The apparatus of claim 17, further comprising:
a control unit configured to generate the control signal, and control an amplitude and/or a period of the control signal based on an amount of the power to be received by the load.

20. A wireless power reception apparatus comprising:
a resonator configured to receive power from another resonator;
a load configured to receive power from the resonator;
a switching unit comprising
a transistor configured to be turned on to connect the resonator to the load, and to be turned off to disconnect the resonator from the load, based on a control signal, and
a diode connected in series to the transistor; and
a capacitor,
wherein the transistor is further configured to be turned on to connect the resonator to the capacitor, and to be turned off to disconnect the resonator from the capacitor, based on the control signal, and
wherein the capacitor is configured to change a resonant frequency of the resonator in response to the capacitor being connected to the resonator.

21. The apparatus of claim 17, further comprising:
a capacitor,
wherein the transistor is further configured to be turned on to connect the resonator to the capacitor, and to be turned off to disconnect the resonator from the capacitor, based on the control signal, and
wherein the capacitor is configured to change a resonant frequency of the resonator in response to the capacitor being connected to the resonator.

22. The wireless power transmission apparatus of claim 1, wherein the resonator self resonates and mutually resonates with the other resonator in response to the transistor being turned off.

23. The wireless power transmission apparatus of claim 1, wherein the control unit is configured to change a thickness of a channel via which a current is moved in the transistor and a resistance of the transistor.

24. The wireless power transmission apparatus of claim 1, wherein the control unit is configured to increase an amount of current transferred from the power supply unit to the resonator by increasing the period of the control signal.

25. The wireless power transmission apparatus of claim 1, wherein the control unit is configured to adjust an amount of power transferred from the power supply unit to the resonator by adjusting the amplitude of the control signal.

26. The wireless power transmission apparatus of claim 1, wherein power is supplied to the resonator without rectification.

27. The wireless power transmission apparatus of claim 1, wherein the transistor is configured to be turned on to connect the power supply unit to the resonator to store power in the resonator, and to be turned off to disconnect the power supply unit from the resonator with the stored power to cause the resonator to begin self-resonating.

* * * * *